United States Patent [19]

Kurkjian et al.

[11] Patent Number: 4,698,792
[45] Date of Patent: Oct. 6, 1987

[54] METHOD AND APPARATUS FOR ACOUSTIC DIPOLE SHEAR WAVE WELL LOGGING

[75] Inventors: Andrew L. Kurkjian, Bethel; Shu-Kong Chang, West Redding, both of Conn.

[73] Assignee: Schlumberger Technology Corporation, New York, N.Y.

[21] Appl. No.: 687,075

[22] Filed: Dec. 28, 1984

[51] Int. Cl.[4] .......................... G01V 1/14; G01V 1/40
[52] U.S. Cl. ........................................ 367/31; 367/32; 367/73; 367/75; 364/422; 181/104
[58] Field of Search ........................ 367/25, 27, 31, 32, 367/34, 49, 73, 75; 364/422; 33/302, 303; 181/102, 104, 106; 73/602

[56] References Cited

U.S. PATENT DOCUMENTS 4,258,322 5/1978 Rocroi et al. ..................... 324/335
4,307,616 12/1981 Valill ................................. 367/100

FOREIGN PATENT DOCUMENTS 2111206 6/1983 United Kingdom ............. 367/75
2132763 7/1984 United Kingdom .

OTHER PUBLICATIONS

G. A. Winbow, "How to Separate Compressional and Shear Arrivals in a Sonic Log", 1980, pp. 2107-2130, 50th International Mtg. of SEG.

Primary Examiner—Nelson Moskowitz
Attorney, Agent, or Firm—David H. Carroll; Stephen L. Borst; David G. Coker

[57] ABSTRACT

The shear velocity of a formation traversed by a fluid-filled borehole is determined in the presence of a significant flexural mode arrival. A plurality of waveforms are obtained from a dipole acoustic investigation of the formation relative to a common location in the borehole. The flexural mode phase velocity as a function of frequency is determined. If a low frequency asymptote is identifiable, it is reported as the shear velocity. If a low frequency asymptote is not identifiable, however, a plurality of additional curves of the flexural mode phase velocity as a function of frequency are theoretically determined, based on respective estimated shear velocities. These theoretically determined curves are respectively fitted to the curve determined from the waveforms, until a satisfactory least error fit is achieved. The last-estimated shear velocity is reported as the shear velocity of the formation.

10 Claims, 20 Drawing Figures

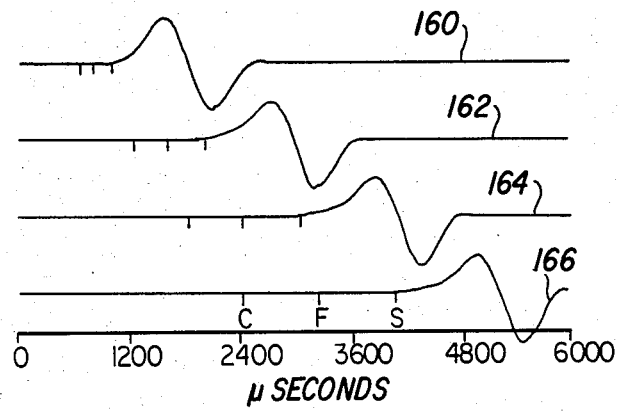
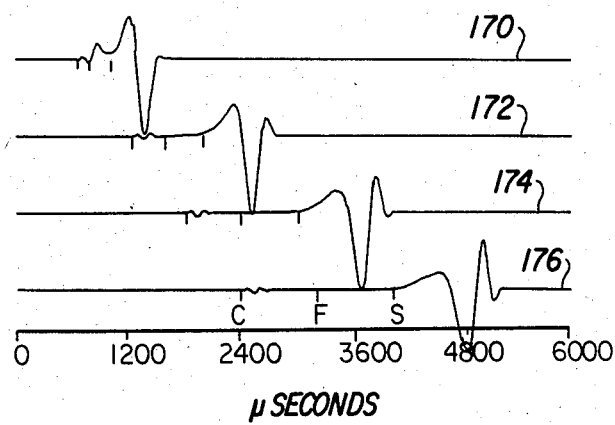
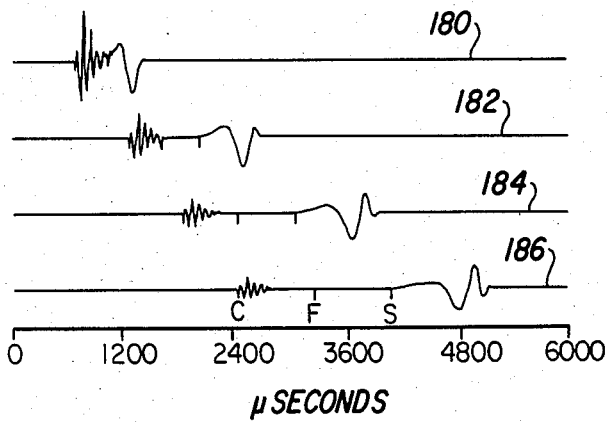
FIG. 9

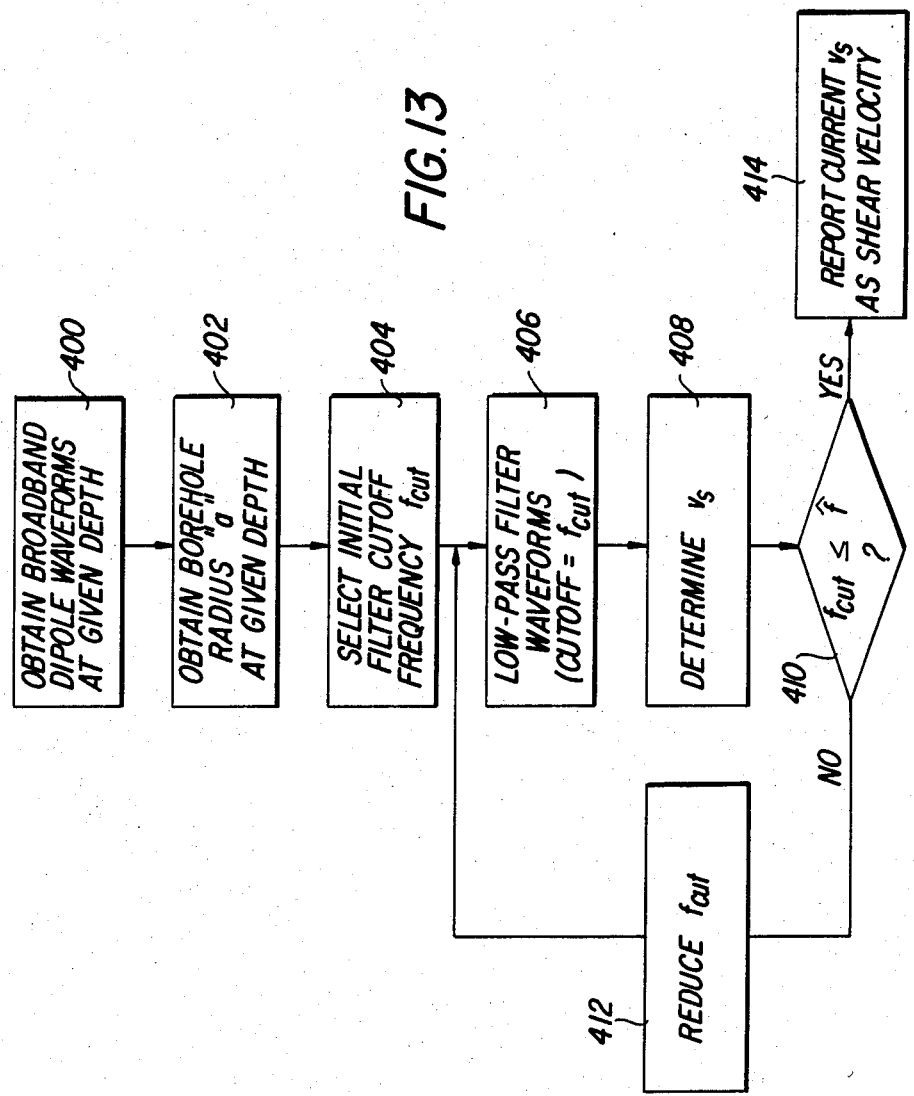

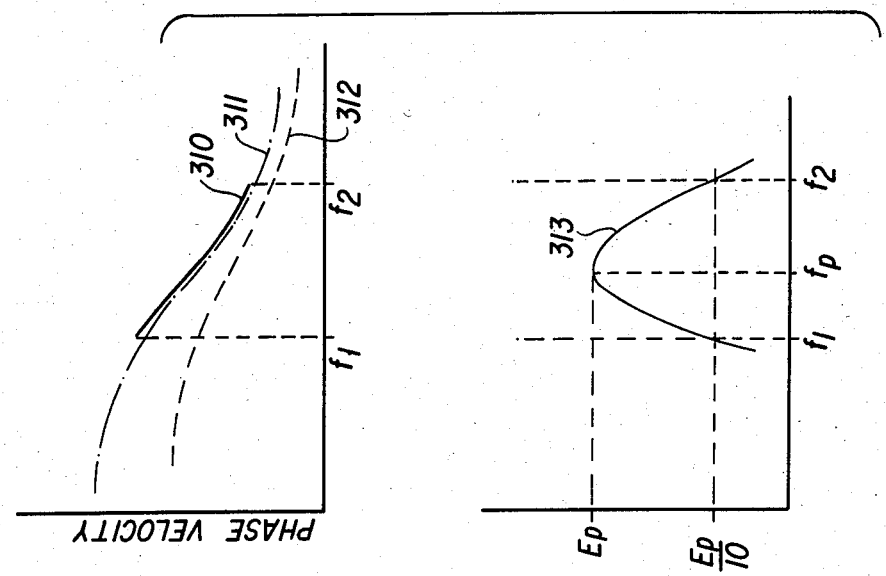
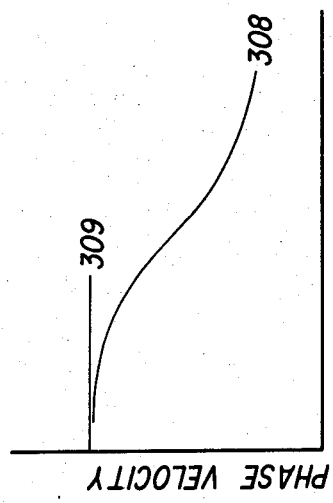
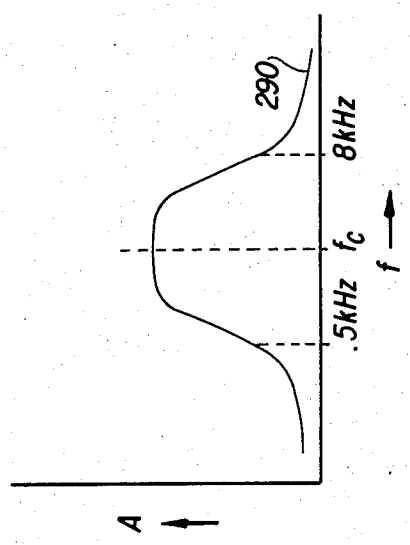
FIG. 19    FIG. 20
FIG. 14

METHOD AND APPARATUS FOR ACOUSTIC DIPOLE SHEAR WAVE WELL LOGGING

BACKGROUND

The present invention relates to a method and apparatus for dipole acoustic well logging; and more particularly, to derived shear wave velocity logging in the presence of interfering acoustic borehole arrivals, with a dipole acoustic source.

An early and widely used technique of sonic logging measures the time required for a compressional sound wave excited by a monopole (axially symmetric) source to traverse one foot of formation. This is known as the "delta t" measurement. See, e.g., Schlumberger Limited, "The Sonic Log," *Log Interpretation: Volume 1, Principles,* 1972, pp. 37-41. The velocity of another type of well known wave, the shear wave, also was found to be useful, and can be obtained from the conventional monopole sonic logging tool under certain circumstances.

In conventional sonic logging, the shear wave is excited when the energy from the monopole source is mode-converted and critically refracted at the borehole wall. Unfortunately, the shear velocity is not consistently available. For example, the shear velocity cannot be obtained directly in a relatively unconsolidated formation in which the shear velocity is less than or equal to the borehole fluid velocity. Under these circumstances, energy traveling at the shear velocity cannot be critically refracted, so that no shear energy propagates along the borehole wall. Moreover, under some circumstances the shear energy is highly attenuated and obscured by the compressional arrival.

As early as 1967, J. E. White proposed a tool for logging a whole family of wave types, including the shear wave, without relying on refraction. J. E. White, "The Hula Log: A Proposed Acoustic Tool," Paper I, *Transactions SPWLA, Eighth Annual Logging Symposium,* 1967. The tool, which included four point force pad-mounted transducers in contact with the borehole wall, was said to be capable of exciting four borehole modes: the radial mode, the axial mode, the torsional mode, and the flexural mode. The radial and axial modes, illustrated in FIGS. 1 and 2, were considered similar to the source characteristics of conventional logging tools. The torsional mode, illustrated in FIG. 3, was said to consist entirely of shear waves. The flexural mode, illustrated in FIG. 4, was said to consist of shear waves coupled with substantial motion of the borehole wall. The vector lines in FIGS. 1-4 indicate the direction of the applied point force. Equal magnitudes are represented. Since the torsional and flexural modes of operation directly excite shear waves, shear events would be expected to be observable even in slow formations where critical refraction cannot occur. For the flexural mode, however, White found only a weak shear event from the slow shale formation.

Since White, other contact or "direct excitation" transducers have been proposed. See, e.g., U.S. Pat. No. 4,394,754, issued Jul. 19, 1983 to Waters; U.S. Pat. No. 4,380,806, issued Apr. 19, 1983 to Waters et al.; and U.S. Pat. No. 3,354,983, issued Nov. 28, 1967 to Erickson et al. Contact apparatus of this type are generally undesirable in commercial applications, because they seriously limit the speed at which the well can be logged.

White also proposed, for the flexural mode, a logging tool having a source for providing a doublet or dipole type of excitation, effected indirectly through the borehole fluid rather than directly through contact of the transducer with the borehole wall. Each of the transmitter and receiver transducers comprise split half cylinders of barium titanate. Consider the transmitter, for example; the half cylinders of the transmitter are driven by opposite polarity voltage, whereby one half cylinder emits a positive pressure pulse and the other emits a negative pressure pulse. See U.S. Pat. No. 3,593,255, issued Jul. 13, 1971 to White.

Other types of logging systems employing indirect dipole excitation sources have been proposed for shear wave logging. Kitsunezaki proposed a dipole source wave having a coil-driven bobbin. The movement of the bobbin ejected a volume of water in direction perpendicular to the borehole axis, while sucking an equivalent volume of water from the opposite direction. See U.S. Pat. No. 4,207,961, issued June 17, 1980 to Kitsunezaki; see also U.S. Pat. No. 4,383,591, issued May 17, 1983 to Ogura.

Other transducer designs for providing indirect excitation dipoles incorporate bender-type elements. The design described in European Patent Application Publication No. 31,989, published July 15, 1981 and naming Angona and Zemanek as coinventors, includes two disc-like piezoelectric elements bonded together and encased in a plastic potting compound. See also U.S. Pat. No. 4,383,308, issued May 10, 1983 to Caldwell.

Several theoretical studies have been conducted to understand the physics of the acoustic energy generated by the indirect excitation dipole transducer. White's analysis of a tool similar to that disclosed in U.S. Pat. No. 3,593,255, supra, assuming a source frequency of 12.5 kHz, did not suggest that a large shear event would occur; hence, White did not conclude that the method looked promising. See J. E. White, "The Hula Log: A Proposed Acoustic Tool," supra. Kitsunezaki ignored the borehole except for transducer-borehole coupling, reasoning that the wave length of the acoustic energy is sufficiently longer than the borehole diameter. See C. Kitsunezaki, "A New Method of Shear Wave Logging", *Geophysics,* Volume 41, Number 10, October 1980, pp. 1489-1506. He treated the wave field by approximating the environment as an infinite homogeneous solid medium, and predicted that the source pulse would propagate nondispersively in the axial direction at the shear velocity of the formation.

The flexural mode has been theoretically studied in the literature for the case of an empty borehole. See A. Bostrom & A. Burden, "Propagation of Elastic Surface Waves Along a Cylindrical Cavity and Their Excitation by a Point Force," *J. Acoust. Soc. Am.,* Vol. 72, No. 3, September 1982, pp. 998-1004; and for a fluid-filled borehole, see W. Roever, J. Rosenbaum, & T. Vining, "Acoustic Waves from an Impulsive Source in a Fluid-Filled Borehole," *J. Acoust. Soc. Am.,* Vol. 55, No. 6, June 1974, pp. 1144-57; R. Kumar & S. Ram, "Flexural Vibrations of a Fluid-Filled Cylindrical Cavity in an Infinite Solid Medium," *Acoustica,* Vol. 22, 1969-70, pp. 163-71. Yet, the flexural mode remains poorly understood, especially in contrast with the familiar tube mode.

Studies based on actual data also have been performed. The OYO Corporation in Japan has pursued Kitsunezaki's shear logging method using his dipole source. See K. Ogura, "Development of a Suspension Type S-Wave Log System," Report No. 1, OYO Technical Note TN-34, OYO Corporation, Urawa Research Institute, Japan, November 1979; K. Ogura, S. Nakanishi, and K. Morita, "Development of a Suspension Type S-Wave Log System," Report No. 2, OYO Technical Note TN-39, OYO Corporation, Urawa Research Institute, Japan, November 1980. A phenomena not predicted by Kitsunezaki's theory was noted; specifically, the frequency content of the direct shear wave was found to be strongly dependent upon the shear speed itself; formations with slow shear speeds produced a lower frequency direct shear wave than formations with faster shear speeds.

The selection of frequency characteristics of dipole sources used in well logging applications has been considered to some extent. It is known generally that the frequency of a dipole source influences the efficacy of shear wave excitation and detection. The frequency range of the transmitter transducer disclosed in the Angona et al. application is about 1 to 6 KHz, with a predominant frequency of about 3 KHz.

Despite these accomplishments, it is believed that the measurement of shear velocity using dipole and multipole sources remains imprecise under certain conditions commonly encountered in borehole logging.

SUMMARY OF THE INVENTION

Accordingly, it is an object of the present invention to improve the precision of the dipole shear wave measurement.

It is another object of the present invention to obtain an accurate acoustic dipole shear wave logging in the presence of a significant flexural mode arrival.

These and other objects are achieved by a method and apparatus for determining the shear velocity of a formation traversed by a fluid-filled borehole. A plurality of waveforms are obtained from a dipole acoustic investigation of the formation relative to a common location in the borehole. The flexural mode phase velocity as a function of frequency is determined. If a low frequency asymptote is identifiable, it is reported as the shear velocity. If a low frequency asymptote is not identifiable, however, a plurality of additional curves of the flexural mode phase velocity as a function of frequency are theoretically determined, based on respective estimated shear velocities. These theoretically determined curves are respectively fitted to the curve determined from the waveforms, until a satisfactory least error fit is achieved. The last-estimated shear velocity is reported as the shear velocity of the formation.

BRIEF DESCRIPTION OF THE DRAWINGS

In the drawings, where like reference characters indicate like parts,

FIGS. 7-10 are traces of waveforms, useful for an understanding of the present invention;

FIG. 13 is a flow diagram of a method in accordance with the present invention;

FIG. 14 is a curve of frequency characteristics;

FIGS. 19 and 20 include curves useful for an understanding of the method of FIG. 18.

DETAILED DESCRIPTION OF THE PREFERRED EMBODIMENTS

Figure 4:
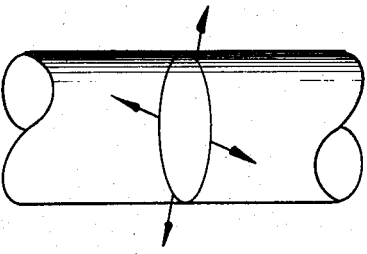
FIGS. 1-4 are prior art drawings illustrating the radial mode, the axial mode, the torsional mode, and the flexural mode as understood by White.
Figure 3:
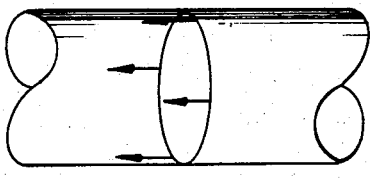
Figure 2:
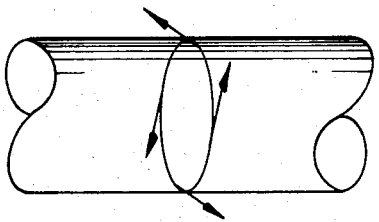
Figure 1:
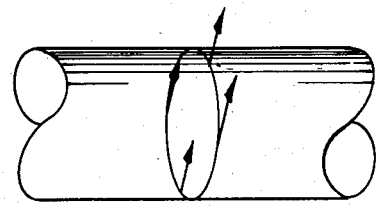
Figures 5, 6:
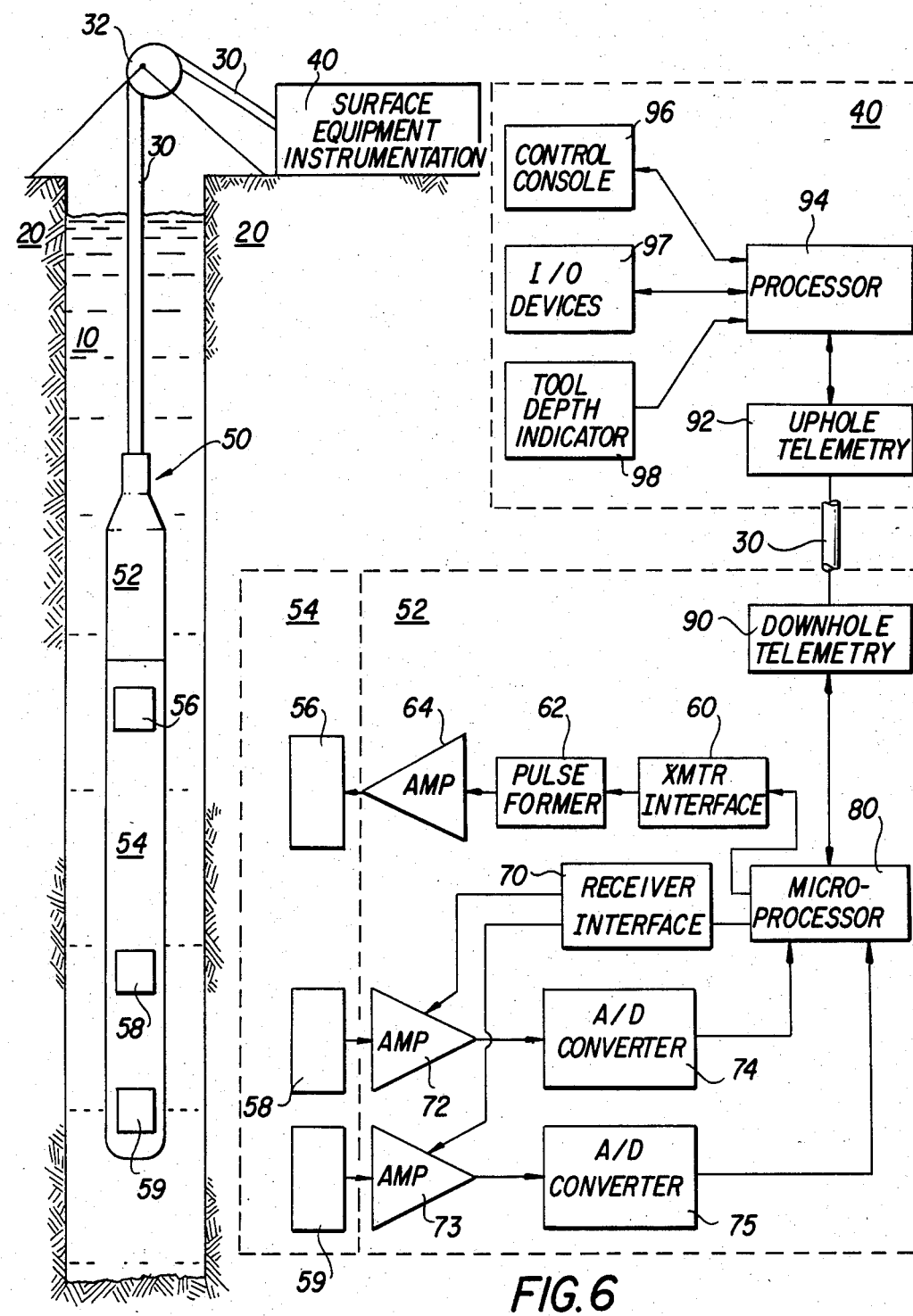
FIG. 5 is a plan view of a dipole acoustic logging system, in accordance with the present invention.
FIG. 6 is a block diagram of the electrical systems of the dipole acoustic logging system, in accordance with the present invention.

A borehole logging system in accordance with the present invention is illustrated generally in FIG. 5. A fluid filled borehole 10 is shown traversing earth formation 20. A dipole acoustic logging tool 50, a mandrel device adapted for movement in the borehole 10, is connected to surface equipment and instrumentation 40 by an armored multiconductor cable 30. The cable 30 is used to raise and lower the tool 50 through borehole 10, and to this end passes over a sheave wheel 32 to a suitable drum and winch mechanism (not shown), an element of the surface equipment 40. Surface equipment 40 also includes a suitable measuring wheel mechanism (not shown), which rotates as a function of the movement of the cable 30 to measure the depth of the tool 50 in the borehole 10.

The tool 50 includes dipole transmitter 56, spaced apart from dipole receivers 58 and 59 in transducer cartridge 54. Two receivers are preferred, although the present invention also contemplates the use of only a single receiver or the use of more than two receivers. Transducers 56, 58 and 59 preferably are of the indirect excitation type, such as disclosed in the aforementioned European patent application Publication No. 31,989, which is incorporated herein by reference, or in UK Patent Application Publication No. 2,124,377, published February 15, 1984 and naming Winbow and Chen as coinventors, which is incorporated herein by reference. Downhole circuits for controlling the excitation of the transmitter 56, the reception of signals through receivers 58 and 59, communications, other functions of tool 50, and possibly some signal processing, are contained in electronics cartridge 52. The cartridge 52 is coupled to surface instrumentation 40 via the conductors in cable 30. Surface instrumentation 40 includes other circuits for communications, power distribution, and signal processing. The signal processing functions may be performed by dedicated circuits or one or more general purpose processors or microprocessors, as desired.

The electrical systems of tool 50 and surface instrumentation 40 are shown in greater detail in FIG. 6, it being understood that the selection and integration of elements shown in FIG. 6 are illustrative only, and that other arrangements are possible. The firing of transmitter 56 is effected through amplifier 64 by pulse former 62, under the control of microprocessor 80 through transmitter interface 60. The resulting acoustic waves are detected by receivers 58 and 59, the outputs of which are amplified by gated amplifiers 72 and 73 respectively, and applied to analog-to-digital converters 74 and 75 respectively. Amplifiers are gated under the control of microprocessor 80, through receiver interface 70. The digitized waveforms are provided to microprocessor 80, wherein they are stored for transmission to the surface and/or for downhole processing, as desired.

Control signals and data are exchanged between downhole electronics 52 and surface instrumentation 40 via downhole telemetry systems 90 and 92 respectively. Downhole telemetry 90 is coupled to microprocessor 80, while uphole telemetry is coupled to processor 94. Microprocessor 80 is any suitable custom or general purpose microprocessor. Processor 94 is any suitable general purpose minicomputer for controlling the logging operation and analyzing downhole data. Also communicating with processor 94 are a field engineer's control console 96, various other I/O devices 97 such as mass storage units and film recorders, and a tool depth indicator 98.

The present invention may be better understood through a theoretical analysis of waveforms attributable to a dipole source operating in both slow and fast formations, along with a comparison of the dipole source waveforms with waveforms attributable to the well known monopole source operating in both slow and fast formations. As used herein, the term "slow formation" means a formation having a shear velocity less than the mud velocity, and the term "fast formation" means a formation having a shear velocity greater than the mud velocity.

Waveforms associated with the well known monopole source include a compressional wave, a shear wave, a tube mode (also referred to as the low frequency Stoneley wave) and normal modes. The normal modes only exist in fast formations, and each normal mode has a low frequency cutoff. In a slow formation, the shear wave is small relative to other arrivals, and is essentially absent in the waveforms. At low frequencies, the tube mode dominates all other arrivals in both slow and fast formations.

Waveforms associated with a dipole source have been found to include a compressional wave, a shear wave, a flexural mode, and normal modes. The compressional and shear waves and the normal modes excited by the dipole are similar to those excited by the monopole. The normal modes are similar in that they exist in fast formations and always have a low frequency cutoff.

As used hereinafter, the term "flexural mode" in a physical sense refers to a bending vibration supported by the borehole. The propagation of this bending, or flexing, is analogous to the propagation of the vibration of a string when it is plucked. A dipole source in effect, "plucks" the hole by pushing it sideways at some point along the hole. This disturbance then propagates axially. It is a mode in the sense that different frequencies are excited by different amounts and travel at different speeds. The term "flexural mode" has been used differently in the art. For instance, White's usage of the term included all waves excited by the so-called shaker source, including shear waves, the flexural mode as used hereinafter, and normal modes.

The flexural mode is unlike the tube mode in most respects. While neither mode has a cutoff, the flexural mode weakens with decreasing frequency, relative to other arrivals and particularly relative to the shear. The tube mode strengthens with decreasing frequency, relative to other arrivals. Hence, below a certain frequency, the shear wave will dominate the flexural mode. This result is in distinct contrast to the monopole case, and explains why a dipole source tool can log shear waves in both slow and fast formations.

The pressure field on the axis of the hole due to a dipole source is, in principle, identically zero. Thus, an array of isotropic pressure sensors placed uphole will detect no signal. In order to sense the dipole field, an array of dipole receiving elements was used. Dipole receivers sense the horizontal component of particle acceleration, velocity, displacement, or pressure gradient, in the same direction in which the source is pointed. Each of these field quantities is non-zero on the axis. In the following analysis, the measuring of particle acceleration, which is proportional to the horizontal pressure gradient across the axis, was assumed. An array of monopole receivers was used to sense the monopole field.

Figure 7:
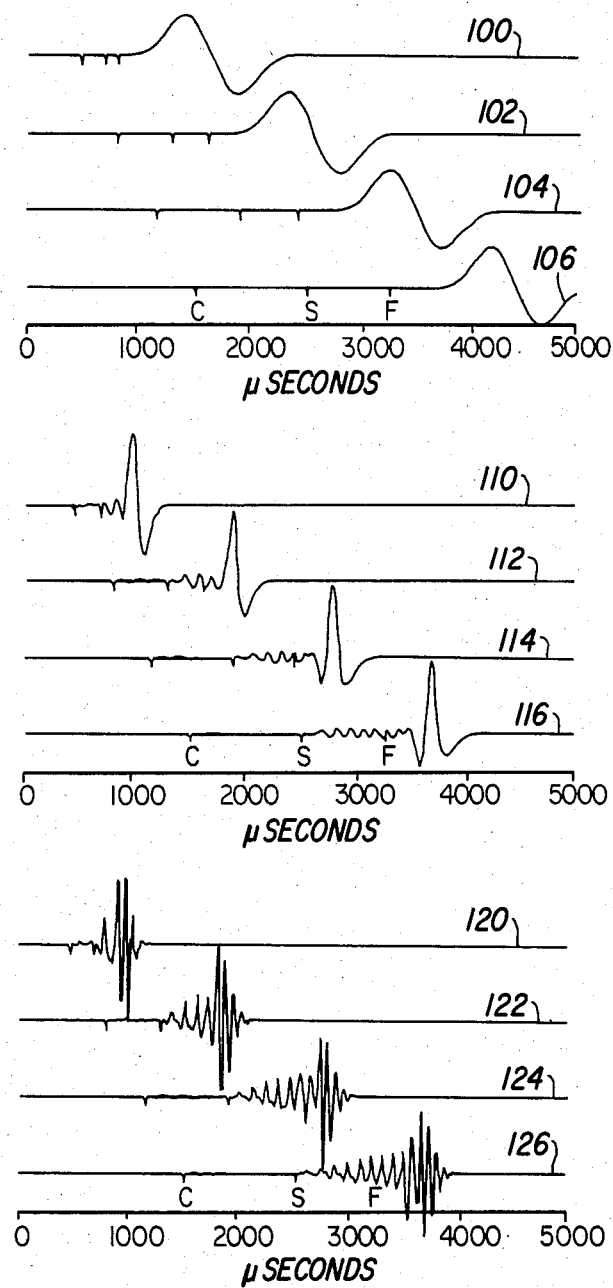
Figure 8:
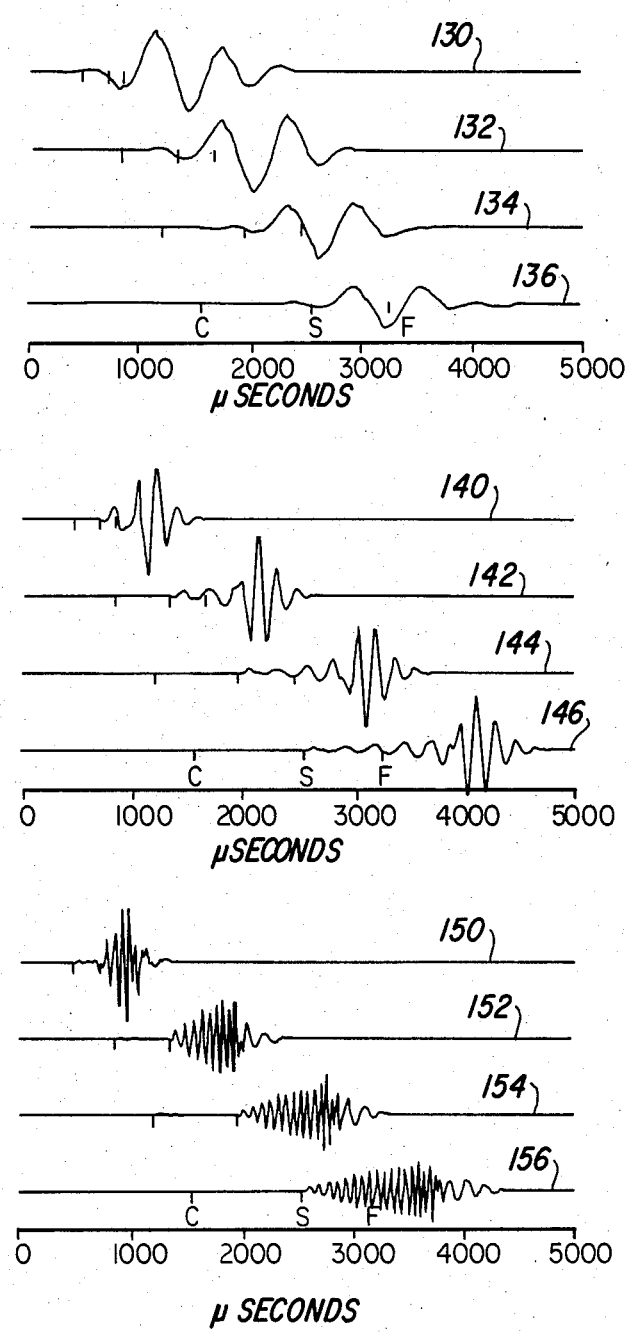

The analysis proceeds with reference to FIGS. 7, 8, 9, and 10, each of which consists of three sets of four waveforms. Within each set, the four waveforms correspond to receivers placed at spacings of 4, 8, 12 and 16 feet from the source. The arrows placed on the time axis of each waveform mark the theoretical arrival time of the compressional ("C"), shear ("S") and fluid ("F") energy, as predicted by ray theory. Note that from waveform to waveform the moveout of the compressional, shear and fluid arrival times is linear. The three sets of waveforms in each figure correspond to the use of a source pulse with a different center frequency. In each figure, the first set corresponds to a 1 kHz source, the second to a 5 kHz source, and the last to a 10 kHz source. FIG. 7 corresponds to the monopole in a fast formation; FIG. 8 corresponds to the dipole in a fast formation; FIG. 9 corresponds to the monopole in a slow formation; and FIG. 10 corresponds to the dipole in a slow formation. The model parameters which describe the fast and slow formations are given in the following table.

TABLE 1

| Parameter | Fast Formation | Slow Formation |
|---|---|---|
| density ratio | 2.0 | 2.0 |
| borehole radius (cm) | 10.0 | 10.0 |
| Poisson's ratio | 0.25 | 0.25 |
| fluid speed (km/s) | 1.50 | 1.50 |
| shear speed (km/s) | 2.0 | 1.20 |
| compressional speed (km/s) | 3.464 | 2.078 |

The fast formation monopole case is illustrated in FIG. 7. With a 1 kHz source pulse (waveforms 100, 102, 104 and 106), the tube mode is seen to dominate the waveforms. All other events are orders of magnitude smaller and cannot be seen. Note also that the velocity of the tube mode is not equal to the shear velocity. With a 5 kHz source pulse (waveforms 110, 112, 114 and 116), the tube mode is much smaller relative to faint compressional arrivals and strong shear arrivals. With a 10 kHz source pulse (waveforms 120, 122, 124 and 126), compressional and shear arrivals are evident. Normal modes, which were cut off when lower frequency sources were used, are evident.

The fast formation dipole case is illustrated in FIG. 8. With the 1 kHz source pulse (waveforms 130, 132, 134, and 136), a bundle of energy is seen to propagate at the shear speed of the formation. This bundle has been found to be a combination of the shear wave and the low frequency portion of the flexural mode. With the 5 kHz source pulse (waveforms 140, 142, 144, and 146), the flexural mode is seen to be the dominant event in the waveforms, traveling slower than the shear speed. The compressional wave is not visible on this scale. With the 10 kHz source pulse (waveforms 150, 152, 154, and 156), the normal modes are strongly excited. These are the higher frequency waves which begin to arrive at the shear arrival time. The flexural mode is much lower in frequency and can be seen as the last event in the waveform. Compressional and shear waves are visible. In summary, from the standpoint of shear logging in a fast formation, the dipole source gives a sizeable shear event for all source frequencies. Furthermore, the waveform is particularly simple at lower frequencies where the only event in the waveform is traveling at the shear speed. Nonetheless, the compressional arrival is apparent only at the higher frequencies.

The slow formation monopole case is illustrated in FIG. 9. With the 1 kHz source pulse (waveforms 160, 162, 164 and 166), a strong tube wave is obtained, much as in the fast formation instance. With the 5 kHz and 10 kHz source pulses (waveforms 170, 172, 174 and 176, and waveforms 180, 182, 184 and 186 respectively), the slow and fast formations cases are greatly contrasting. In the slow formation case, the waveforms consist of a compressional wave and a tube mode. The shear event is not visible, and no modal arrivals are found. This result is predicted by ray theory, and has been observed in field waveforms.

Figure 10:
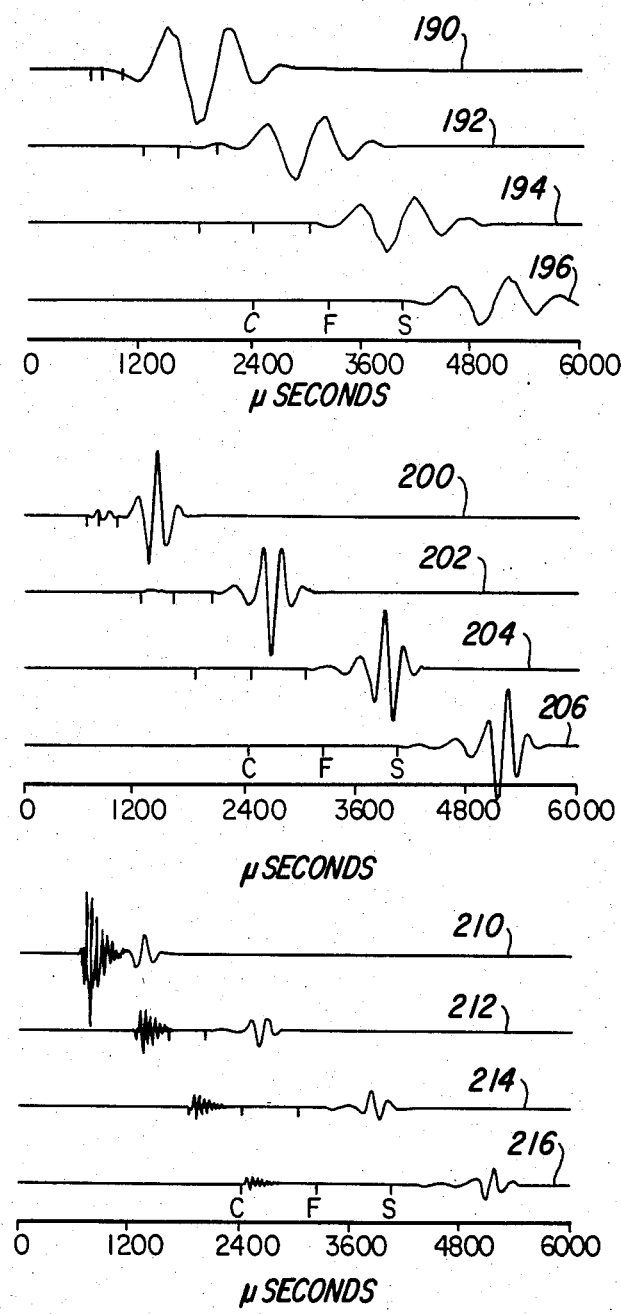

The slow formation dipole case is illustrated in FIG. 10. The results obtained with the 1 kHz source (waveforms 190, 192, 194 and 196) are of great interest, in that the energy in the waveforms is seen to travel at the shear velocity of the formation. With the 5 kHz and 10 kHz source pulses (waveforms 200, 202, 204 and 206, and waveforms 210, 212, 214, and 216 respectively), the slow formation dipole case is analogous to the slow formation monopole case, insofar as only the compressional wave and the flexural mode are significant arrivals.

It has been discovered that the energy in the waveforms 190, 192, 194 and 196 which travels at the shear velocity of the formation, is a combination of two phenomena, the flexural mode and the shear wave. In principle, shear velocity can be obtained at low frequency, since the shear wave dominates at low frequency. In practice, dipole shear logging preferably is conducted not outside of a range of frequencies. An excessively low frequency will not sufficiently excite the shear wave, while an excessively high frequency will excite interfering waves. It also has been discovered that while use of frequencies greater than the upper bound frequency results in waveforms dominated by the flexural mode (for example, as with the 5 kHz pulse), the shear velocity may be determined from the flexural mode. This is because the propagation characteristics of the flexural mode are controlled primarily by the shear speed of the formation. Moreover, it has been discovered that flexural wave dipole logging can be achieved at or above the upper bound shear logging frequency. Hence, dipole shear logging either below the upper bound frequency or derived from the flexural mode are powerful and robust logging techniques, capable of providing continuous and accurate shear velocity measurements in slow and fast formations alike.

Direct Shear Velocity Dipole Logging

It has been discovered that direct shear velocity logging with a dipole source should be performed over a range of frequencies bounded at the upper end by the frequency $f_u$, the frequency at and below which acoustic energy propagates at the formation shear speed, and above which energy does not propagate at the formation shear speed. Moreover, it has been discovered that preferably, frequencies at or just below $f_u$ should be used, because significant amplitude reduction of the shear wave occurs as frequency decreases. The frequency $f_u$ depends upon the borehole radius, which is generally a known quantity, and upon the formation shear velocity, the value of which is to be determined.

Figure 11:
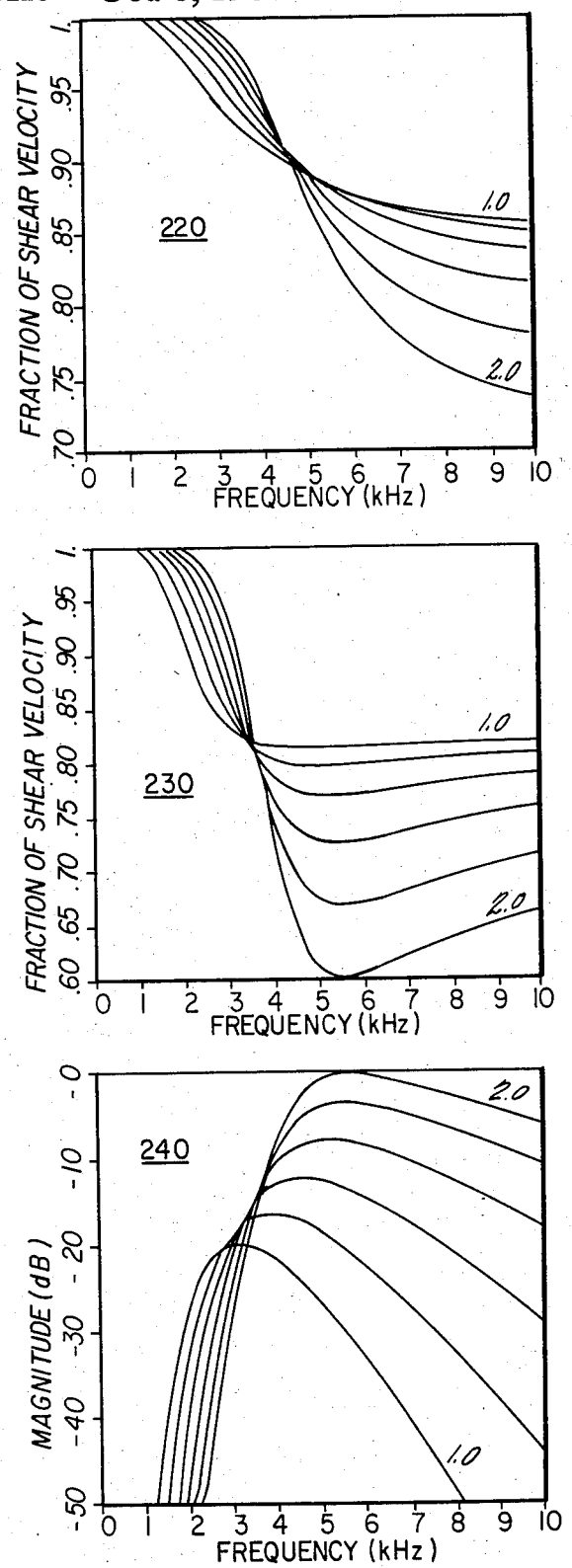
FIG. 11 includes curves of dispersion and excitation of the flexural mode for several fast and slow formations, useful for an understanding of the present invention.
Figure 12:
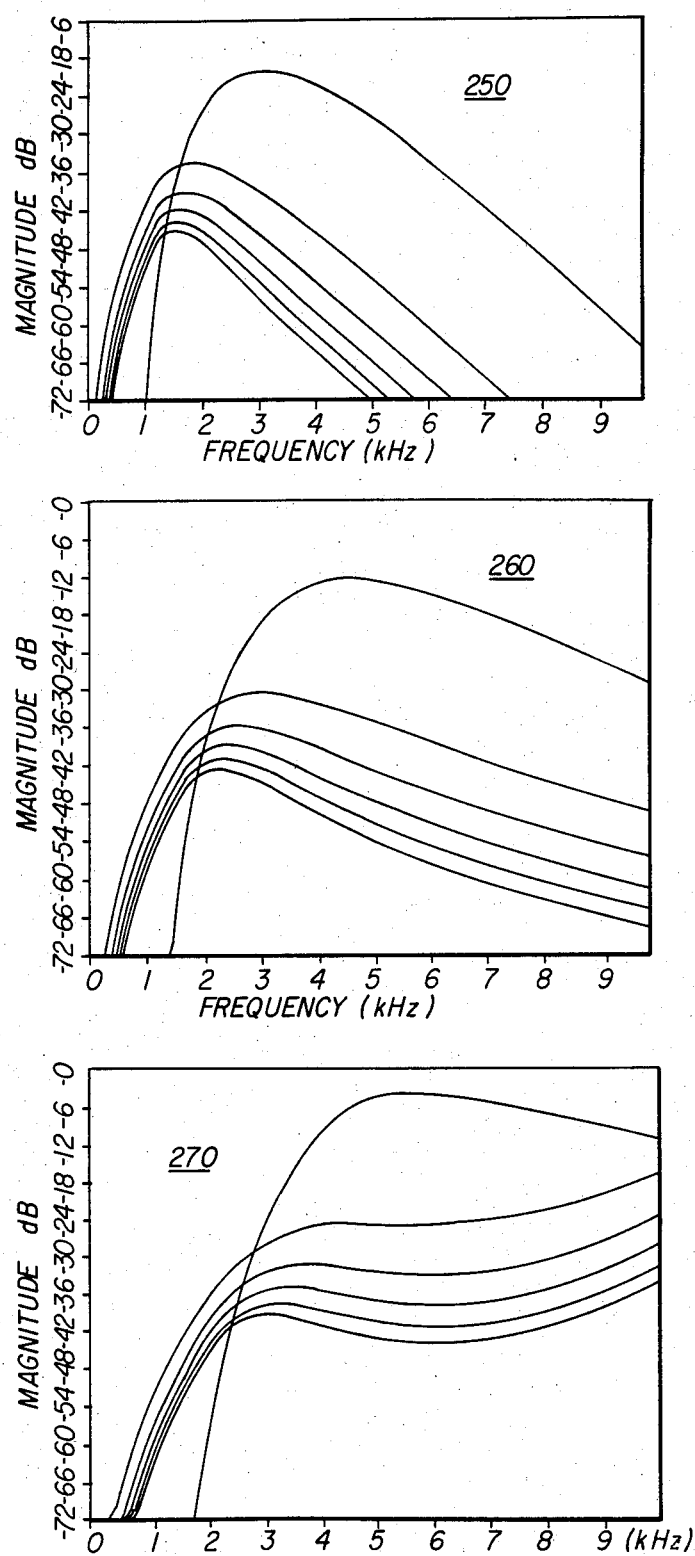
FIG. 12 includes curves showing the tradeoff between the shear wave and the flexural mode for three different formation models, useful for an understanding of the present invention.

The existence of the upper frequency is evident from a perusal of curve groups 220, 230, and 240 of FIG. 11, which show the dispersion and excitation of the flexural mode for several fast and slow formations; and of curve groups 250, 260, and 270 of FIG. 12, which show the tradeoff between the shear wave and the flexural mode for three different formation models.

In FIG. 11, the 6 curves of each curve group 220, 230 and 240 correspond to respective formations having shear speeds of 1 km/s, 1.2 km/s, 1.4 km/s, 1.6 km/s, 1.8 km/s, and 2 km/s. Poisson's ratio for each formation was taken to be ¼. All other model parameters are the same as in Table 1 above.

The curves of group 220 show phase velocity of the flexural mode as a function of frequency. The velocity has been normalized by the shear speed of the formation. Note that, in all the formations, the phase velocity of the flexural mode tends to the shear speed of the formation at low frequencies. At high frequencies, the phase velocity curve for any particular formation is seen to asymptotically approach a final value, given by the velocity of a Stoneley mode on a planar liquid/solid interface. This Stoneley speed is different for different formations. The curves of group 230 show group velocity of the flexural mode as a function of frequency, in the same format as the curves of group 220. As in the case of the phase velocity, the group velocity tends to the shear speed at low frequencies, and to the Stoneley mode speed at high frequencies. The curves of group 240 show the magnitude in dB of the residue of the flexural mode pole as a function of frequency, in the same format as the curves of group 220. The curves of group 240 reflect the degree to which the mode is excited at each frequency. Note that the flexural mode is resonant in nature in that it drops off considerably at both low and high frequencies. The mode becomes more resonant and smaller in amplitude as the formation becomes slower. Note also that the frequency where the mode peaks is roughly the frequency where the group velocity is a minimum. This means that most of the energy will arrive toward the end of the flexural mode arrival.

In FIG. 12, the formations have shear speeds of 1 km/s (curve group 250), 1.4 km/s (curve group 260) and 1.8 km/s (curve group 270). As before, all other model parameters are as in Table 1. Each of the curve groups 250, 260 and 270 show the excitation of the flexural mode, which is the same at all offsets from the source, and the excitation of the shear wave for source offsets of 3, 6, 9, 12 and 15 feet.

The shear wave is resonant in nature, similar to the flexural mode, particularly in the slower formations. The amplitude of the shear wave decreases with offset (due to geometrical spreading), however, and can be either larger than or smaller than the flexural mode. At higher frequencies, the flexural mode dominates the shear event, while the reverse is true at lower frequencies. From curve group 250, it is apparent that at lower frequencies, the shear wave is larger than the flexural mode. The reverse is true at higher frequencies, however. Moreover, at the frequency where the flexural mode is strongest, the mode is 20 db (factor of 10) larger than the shear wave at a receiver offset of 3 feet, and 40 db (factor of 100) larger than the shear wave at a receiver offset of 15 feet. The frequency at which the shear wave and flexural mode are of equal amplitude depends weakly upon the source-to-receiver offset, and is referred to as the crossover frequency. The crossover frequency at larger offsets is lower than that at shorter offsets. Curve groups 260 and 270 are similar in character to group 250, and illustrate the effect of changing the formation properties. While the curves of group 250 correspond to a "slow formation," the curves of group 270 correspond to a "fast formation" and the curves of group 260 correspond to a formation between slow and fast. The commentary associated with curve group 250 applies equally well to curve groups 260 and 270. Note that the crossover frequency tends to increase as the formation shear speed increases.

The quantitative determination of the upper frequency $f_u$ can be achieved in three different ways. The frequency $f_u$ may be set equal to the frequency at which the phase velocity of the flexural mode is within a selected percentage, for example one percent, of the formation shear speed. The frequency $f_u$ may be set equal to the frequency at which the group velocity of the flexural mode is within a selected percentage, for example one percent, of the formation shear speed. The frequency $f_u$ may be set equal to the frequency at which the amplitude of the formation shear speed is equal to that of the formation flexural mode (i.e. the crossover frequency). A determination of the upper frequency using each of these three methods follows.

The frequency at which the phase velocity of the flexural mode is 99% of the formation shear speed $v_s$ is given by $$f_u = \zeta \frac{v_s}{a} \tag{1}$$

where a is the borehole radius and $\zeta$ ranges from 0.154 in the fastest to 0.178 in the slowest of the formations represented by group 220.

The frequency at which the group velocity of the flexural mode is 99% of the formation shear speed is given by $$f_u = \zeta \frac{v_s}{a} \tag{2}$$

where $\zeta$ ranges from 0.117 in the fastest to 0.126 in the slowest of the formations represented by group 230.

The crossover frequency is obtained from curve groups 250, 260 and 270. The crossover frequency depends upon the source-to-receiver offset. Since the crossover frequency decreases with increasing offset, we use the crossover frequency at the largest anticipated offset as our standard, which in this case is 15 feet. Using the crossover frequency associated with the largest offset insures that at all shorter offsets, the shear wave will dominate the flexural mode. From curve groups 250, 260 and 270, then, the crossover frequency at fifteen feet offset is given by $$f_u = \zeta \frac{v_s}{a} \tag{3}$$

where $\zeta$ ranges from 0.128 in the fastest to 0.137 in the slowest of the formations represented by groups 250, 260 and 270.

Each of these three different approaches for quantitatively determining the upper frequency are reasonable, yet the upper frequency $f_u$ predicted from group velocity is less than that predicted from amplitude crossover, which in turn is less than that predicted from phase velocity. Fortunately, the upper frequencies computed using these three approaches are not dramatically different.

In the preferred embodiments to follow, the upper frequency $f_u$ is defined as the frequency at which the phase velocity of the flexural mode is 99% of the shear speed of the formation. The choice is based on the use in the preferred embodiments of velocity estimation techniques such as Slowness-Time-Coherence, see C. V. Kimball and T. L. Marzetta, "Semblance Processing of Borehole Acoustic Array Data," *Geophysics,* Vol. 49, No. 3, March 1984, pp. 274–81; U.S. Pat. application Ser. No. 593,932, filed Mar. 27, 1984 (Kimball et al., "Sonic Well Logging"), U.S. Pat. No. 4,594,691 which are incorporated herein by reference. When applied to an array of recorded borehole waveforms, the velocity estimation techniques produce estimates of the phase velocity of the arrivals, provided that the arrivals are nondispersive or dispersive but narrowband. It is preferable, but not necessary, that the selected velocity estimation technique and the definition of $f_u$ involve the same parameter. In this way, below the upper frequency the Slowness-Time-Coherence technique will produce the shear speed of the formation to within 1% accuracy.

With the phase velocity criterion selected for defining the upper frequency, the scale factor $\zeta$ can vary from 0.154 in fast formations to 0.178 in slow formations. The value of $\zeta$ may be simplified to a constant nominal value for all formations of interest, provided the selected value will not predict upper frequencies that are excessively high. The value 0.15 is suitable. Nonetheless, the choice is not overly sensitive, and values of $\zeta$ varying from 0.12 to 0.18, for example, will not dramatically degrade performance. Hence, the upper frequency $f_u$ is defined for practical purposes as $$f_u = 0.15 \frac{v_s}{a} \tag{4}$$

The range over which $f_u$ can be expected to vary in practice is limited. The large majority of boreholes drilled for oil and gas exploration and production range in radius from 7.62 cm to 13.33 cm, while shear velocities in earth formations vary from 0.5 km/s to 4 km/s. Based on the largest likely shear speed of 4 km/s and the smallest likely hole size of 7.62 cm, the highest upper frequency likely to occur is about 8 kHz. Based on the lowest shear speed of 500 m/s and the largest hole size of 13.33 cm, the lowest upper frequency likely to occur is about 500 Hz.

Although the range over which $f_u$ can be expected to vary is limited, it is preferable to log at the highest possible frequencies without exceeding the $f_u$ for the formation and borehole in question. The reason is that amplitude reduces as the square of frequency. Specifically, according to A. L. Kurkjian, "Radiation from a Low Frequency Horizontal Acoustic Point Force in a Fluid-Filled Borehole," Expanded Abstracts, 54th Annual International SEG Meeting, Borehole Geophysics I, December 1984, pp. 5–7, which is incorporated herein by reference, the amplitude of the dipole shear wave at low frequencies behaves as $$\frac{f^2}{\rho v_s^2 z} \text{ for } f < 0.05 \frac{v_s}{a} \text{ and } z > \frac{v_s}{f} \tag{5}$$

According to expression (5), the shear wave amplitude decreases with decreasing frequency, increasing offset "z," increasing density "$\rho$," and quickening formation shear velocity "$v_s$." This result assumes that the transmitter applies a specified force, and that the receiver senses particle acceleration.

The importance of logging with frequencies at or near the upper frequency is well illustrated by curve groups 250, 260 and 270 of FIG. 12. For example, assume ignorance of the property that the upper frequency increases with increasing shear speed, and suppose that a 1 kHz narrowband source has been randomly selected. Group 250 illustrates that fortuitously, the source frequency is quite near the crossover frequency $f_c$ and the received signals would be expected to contain a dominating shear wave. On the other hand, groups 260 and 270 illustrate that a significantly weaker shear wave would be obtained. Although the 1 kHz narrowband source would have been appropriate for logging the formation to which group 250 relates, a 1.5 kHz narrowband source would have been significantly better for logging the formation to which group 260 relates, and a 2 kHz narrowband source would have been better for logging the formation to which group 270 relates.

In summary, direct shear wave logging using a dipole source should be conducted with frequencies limited at the upper end by the frequency $f_u$. The lower limit of the preferred frequency range is relatively unimportant, but acoustic energy is wasted if the source spectrum is not concentrated near the frequency $f_u$.

A preferred method for dynamically determining the optimal dipole shear logging frequency is illustrated in FIG. 13. The method of FIG. 13 requires that the transducers 56, 58 and 59 have a broadband frequency response; for well logging purposes, rich in frequencies over the range of 500 Hz to 8 kHz, as illustrated by curve 290 in FIG. 14. In accordance with the analysis above, this bandwidth is suitable for most formation types and hole sizes likely to be encountered in practice. The waveforms are obtained in step 400 by energizing transmitter 56 with a suitable pulse supplied by pulse former 62 and amplified by amplifier 64. The timing of the pulse is directed by microprocessor 80, through transmitter interface 60. Propagating acoustic energy is detected by receivers 58 and 59, the outputs of which are amplified by gated amplifiers 72 and 73 under control of microprocessor 80 through receiver interface 70. Waveform data is digitized by converters 74 and 75, and provided to microprocessor 80. In step 402, the borehole radius "a" at the given depth is obtained, either from mechanical or ultrasonic caliper measurements taken by well known techniques or from an assumed nominal value, and supplied (not shown) to microprocessor 80.

The detected waveforms for a given depth (step 400) will include energy traveling at the shear velocity of the formation, but quite likely also will include energy traveling slower than the shear speed at frequencies above the upper frequency. The slower traveling energy is removed by low-pass filtering the detected waveforms. Since the upper frequency $f_u$ is not initially known, a suitable low-pass filter cannot be selected a priori. Nonetheless, an initial low-pass filter can be applied to the waveforms, and the result tested to determine whether the cutoff frequency of the low pass filter was low enough.

Accordingly, an initial estimate for the cutoff frequency $f_{cut}$ is selected at step 404. An initial value of 8 kHz is suitable, since as explained above, it is the greatest upper frequency that would be expected to be encountered in practice. The detected waveforms are filtered at step 406 with a low pass filter characterized by the selected $f_{cut}$. The filter may be implemented digitally on microprocessor 80, or may be implemented digitally on processor 94 (microprocessor 80 acting as a buffer for the digitized waveforms), or may be implemented by well known analog filter circuits with which the waveforms are filtered before being supplied to converters 74 and 75. A velocity $v_s$ then is determined from the filtered waveforms at step 408, either by microprocessor 80 or processor 94, using such known techniques as the Slowness-Time-Coherence, for example, which is discussed above.

A determination is made at step 410 as to whether $f_{cut}$ is suitably low. A frequency $\hat{f}$ is computed in accordance with the expression $$\hat{f} = 0.15 \, v_s/a \tag{6}$$

and $\hat{f}$ is compared to $f_{cut}$.

If $f_{cut}$ is too high, then $v_s$ will be too low because of the flexural wave and the condition $f_{cut} \leq \hat{f}$ will not be satisfied. The frequency $f_{cut}$ is reduced by some suitable amount at step 412, and steps 406, 408, 410 and 412 executed iteratively until the condition at step 410 is satisfied. The amount by which $f_{cut}$ is reduced preferably is proportional to $$f_{cut} - \hat{f} \tag{7}$$

In this way, if $f_{cut}$ and $\hat{f}$ are far apart, then a large reduction in $f_{cut}$ is achieved in the next iteration, whereas if $f_{cut}$ and $f$ are not far apart, than a small reduction in $f_{cut}$ is achieved in the next iteration. Alternatively, the current value of f may be substituted as the next value of $f_{cut}$.

On the other hand, if $f_{cut}$ is at or below $f_u$, the preferred upper bound frequency, then $v_s$ will be correct and $\hat{f}$ will be greater than or equal to $f_{cut}$. The condition $f_{cut} \leq \hat{f}$ having been satisfied, $v_s$ will be reported as the shear velocity at step 414.

Figure 15:
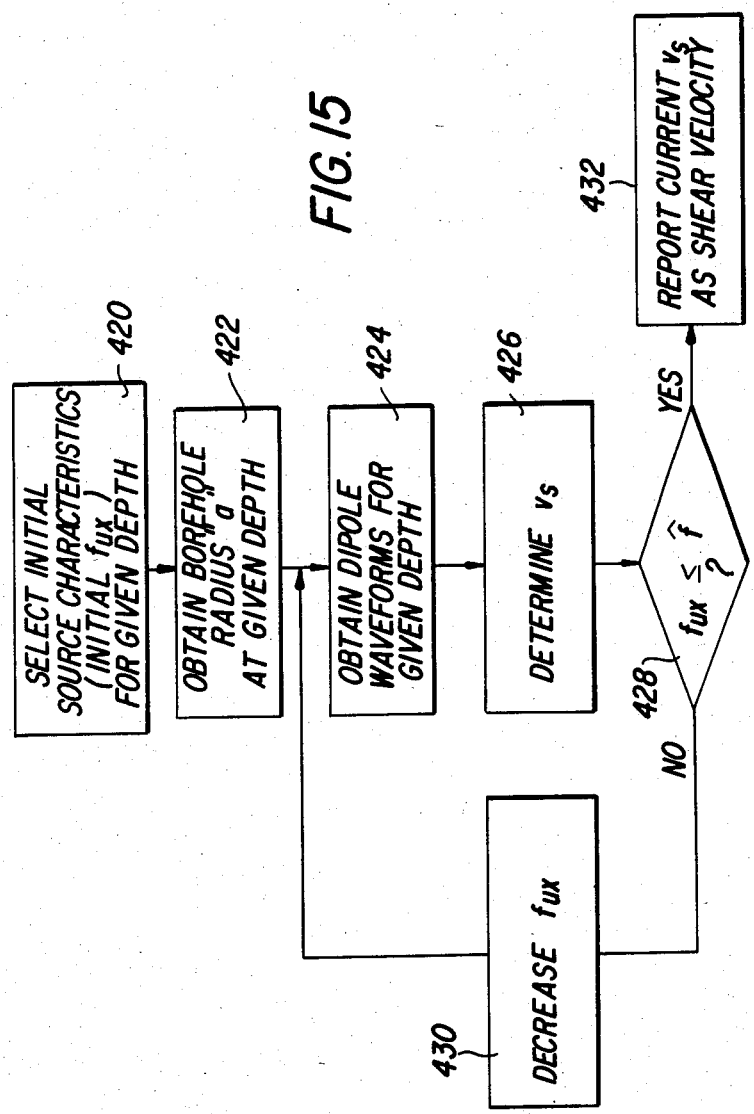
FIG. 15 is a flow diagram of another method in accordance with the present invention.

Alternatively, the frequency of the transmitter transducer 56 may be electronically adjusted to the optimal frequency, as illustrated in FIG. 15. In step 420, initial parameter values for pulse former 62 are selected, such that the upper bound frequency $f_{ux}$ of the transmitter 56 initially is 8 kHz, as discussed above. The borehole radius "a" is obtained in step 422, essentially as described supra with reference to FIG. 16. The transmitter 56 is excited and waveforms obtained at step 424, as described above with reference to FIG. 13. A value for $v_s$ is determined either by microprocessor 80 or processor 94 at step 426, and tested for accuracy at step 428, essentially as described above with reference to FIG. 13. If the test is not satisfied, $f_{ux}$ is lowered at step 430, and steps 424, 426, 428 and 430 are executed iteratively until test 428 is satisfied. The value of $v_s$ then is reported as the direct shear measurement at step 432.

A simple but less adaptable technique for measuring shear velocity requires that transducers 56, 58 and 59 be selected with a narrow bandwidth and an upper frequency $f_{ux}$ satisfying the condition $$f_{ux} = 0.15 \frac{v_{s\text{-}min}}{a_{max}} \qquad (8)$$

where "$a_{max}$" is the maximum borehole radius of interest and $v_{s\text{-}min}$ is the slowest shear velocity of interest. For example, if $a_{max}=13.33$ cm and $v_{s\text{-}min}=0.5$ km/sec, then f=500 Hz.

Yet another simple technique requires that a logging tool be provided with several groups of transmitter and receiver transducers, such that the transducers of each group have common frequency characteristics different that the frequency characteristics of the other groups. The measurement provided by the highest frequency group satisfying the condition $f_{cut} \leq f$ (described above) is selected as the proper shear velocity measurement.

The techniques described above generally are applicable to a cased borehole as well, although additional considerations are present. These considerations lead to a frequency criterion for a reduced effect of the flexural and casing modes, by which the dominant signal in the receiver waveforms will be the formation shear wave.

Figure 16:
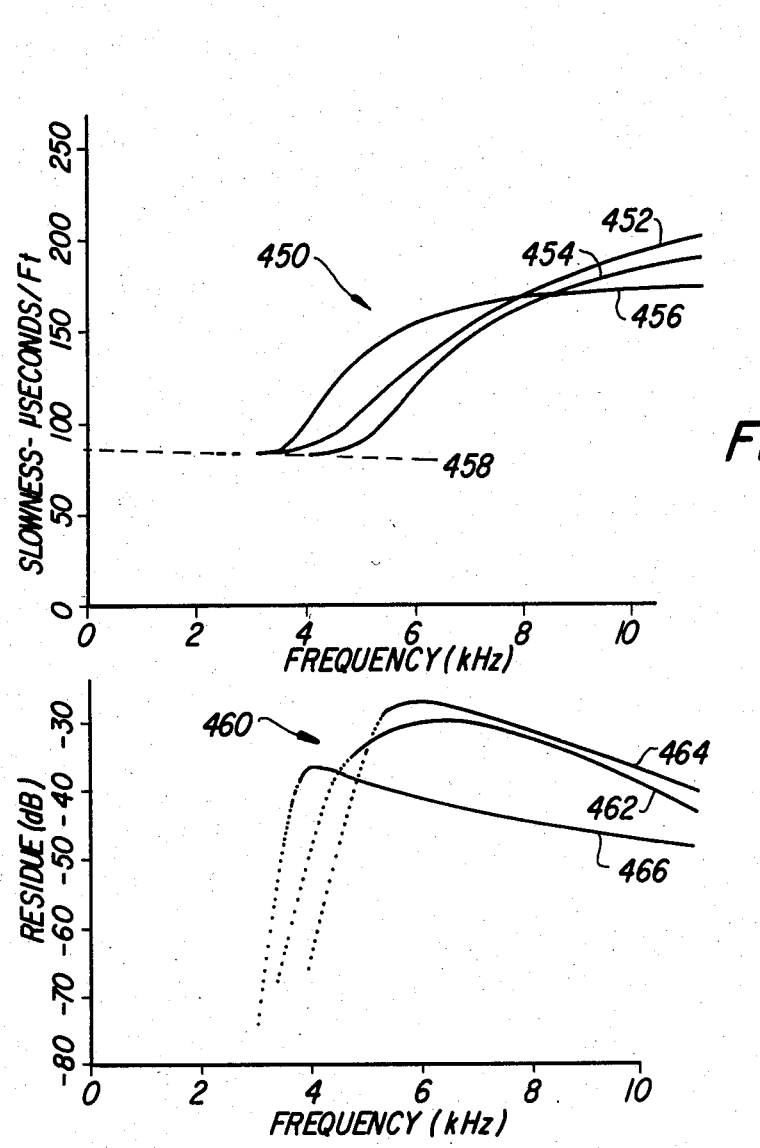
FIG. 16 includes curves illustrating flexural mode phase slowness and flexural mode residue for three cases: an unbonded cased hole, a well bonded cased hole, and an open hole.

The analysis proceeds with reference to FIG. 16. A group of curves 450 illustrates flexural mode phase slowness (the inverse of modal phase velocity) and another group 460 illustrates flexural mode residue (a quantity indicating the strength of the mode being excited by a dipole source in the borehole) for three cases of interest: an unbonded cased hole at 452 and 462, a well bonded cased hole at 454 and 464, and an open hole at 456 and 466. The formation is fast, i.e. the formation shear speed is faster than the speed of the acoustic waves in the borehole mud. The slowness curves of group 450 all approach the formation shear slowness at low frequencies, although the frequency at which the flexural mode approaches the shear slowness is higher in the cased holes than in the open hole. One reason for this is the small diameter of the cased hole. The residues illustrated by the curves of group 460 indicate that the flexural mode in cased holes is excited at higher frequencies. Hence, the upper frequency selected for open hole logging in accordance with expression (4) will suffice for logging cased holes as well. Moreover, an upper frequency for cased hole logging can be selected in accordance with expression (4), with "a" being the radius of the casing. Similarly, the methods of FIGS. 13 and 15 and others discussed above apply to cased holes, with "a" being the radius of the casing.

Figure 17:
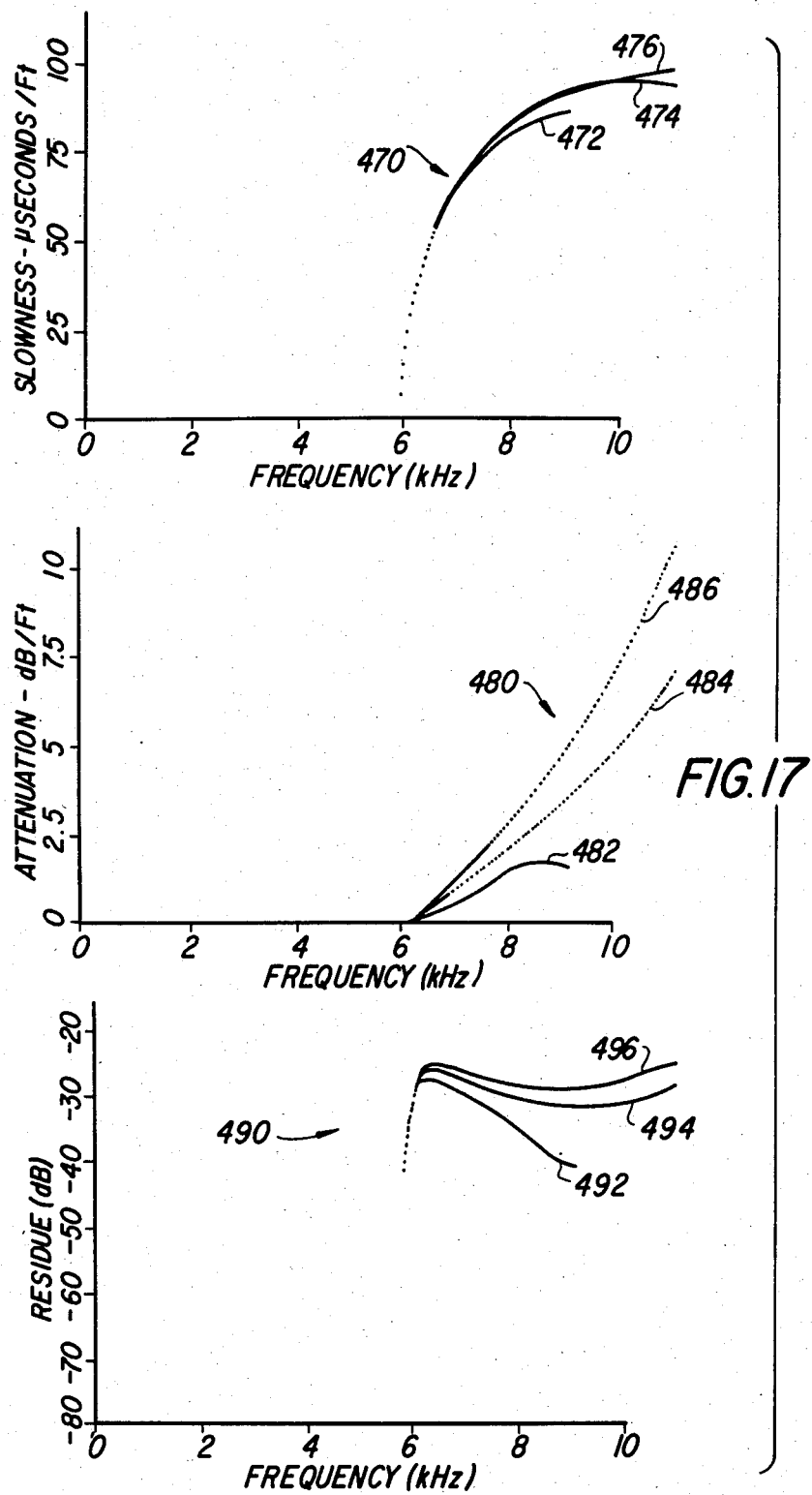
FIG. 17 includes curves illustrating the modal phase slowness, attenuation, and residue of the casing mode.

In selecting an upper frequency for cased hole logging, however, the effect of the casing mode also must be considered. Casing modes arise in unbonded and poorly bonded casings. The modal phase slowness (group 470), attenuation (group 480), and residue (group 490) of the casing mode is illustrated in FIG. 17 for three different kinds of formations, having the following compressional and shear slownesses: 50 and 85 microseconds/foot respectively, curves 472, 482 and 492; 100 and 170 microseconds/foot respectively, curves 474, 484, and 494; and 150 and 255 microseconds/foot, curves 476, 486 and 496. It has been discovered that the casing mode cuts off in this example at about 6 kHz, and that the cutoff frequency is insensitive to the rock formation outside of the cement layer. The casing mode has a very fast phase velocity near the cutoff frequency (group 470). The mode attenuates above the cutoff frequency (group 480), and its strength of excitation drops off near the cutoff frequency (group 490). Hence, dipole logging in a cased hole should be conducted below the cutoff frequency of the casing mode.

The casing mode cutoff frequency $f_{cmc}$ is determined from the dimensions of the casing, in accordance with the expression $$f_{cmc} \simeq 0.16 \frac{v_{casing}}{r_{casing}} \qquad (9)$$

where $v_{casing}$ is the shear speed of the casing material in cm/sec, $r_{casing}$ is the mean radius of the casing in centimeters, and $f_{cmc}$ is the casing mode cutoff frequency in hertz. The cutoff frequency is relatively insensitive to the casing thickness. For most commonly encountered cased wells, the casing mode cutoff $f_{cmc}$ is higher than the flexural mode cutoff $f_u$, and presents no danger if the upper frequency $f_u$ is selected based on either the open hole direct shear criterion or the cased hole direct shear criterion. When the shear from flexural technique, which is described below, is being practiced in the cased hole in accordance with either open hole or cased hole criteria, care should be taken not to exceed the casing cutoff frequency.

Shear Derived from the Flexural Mode

It has been discovered that the frequency content, amplitude and velocity of the flexural mode is sensitive to the shear speed of the formation. The present invention may be better understood from a consideration of the basis for this discovery, followed by a description of an embodiment of the present invention.

The dispersion and excitation of the flexural mode for several fast and slow formations is shown in FIG. 11, which was discussed above in detail. From that discussion, the curves of groups 220, 230, and 240 can be seen to support the discovery that the flexural mode is sensitive to the shear speed of the formation. Moreover, it has been discovered that changes in the Poisson's ratio, the fluid velocity and the density ratio all have a relatively small influence on these curves. Changes in the borehole radius has the effect of scaling the frequency axis. Hence, where borehole radius is known, the flexural mode is controlled primarily by the shear speed of the formation.

Figure 18:
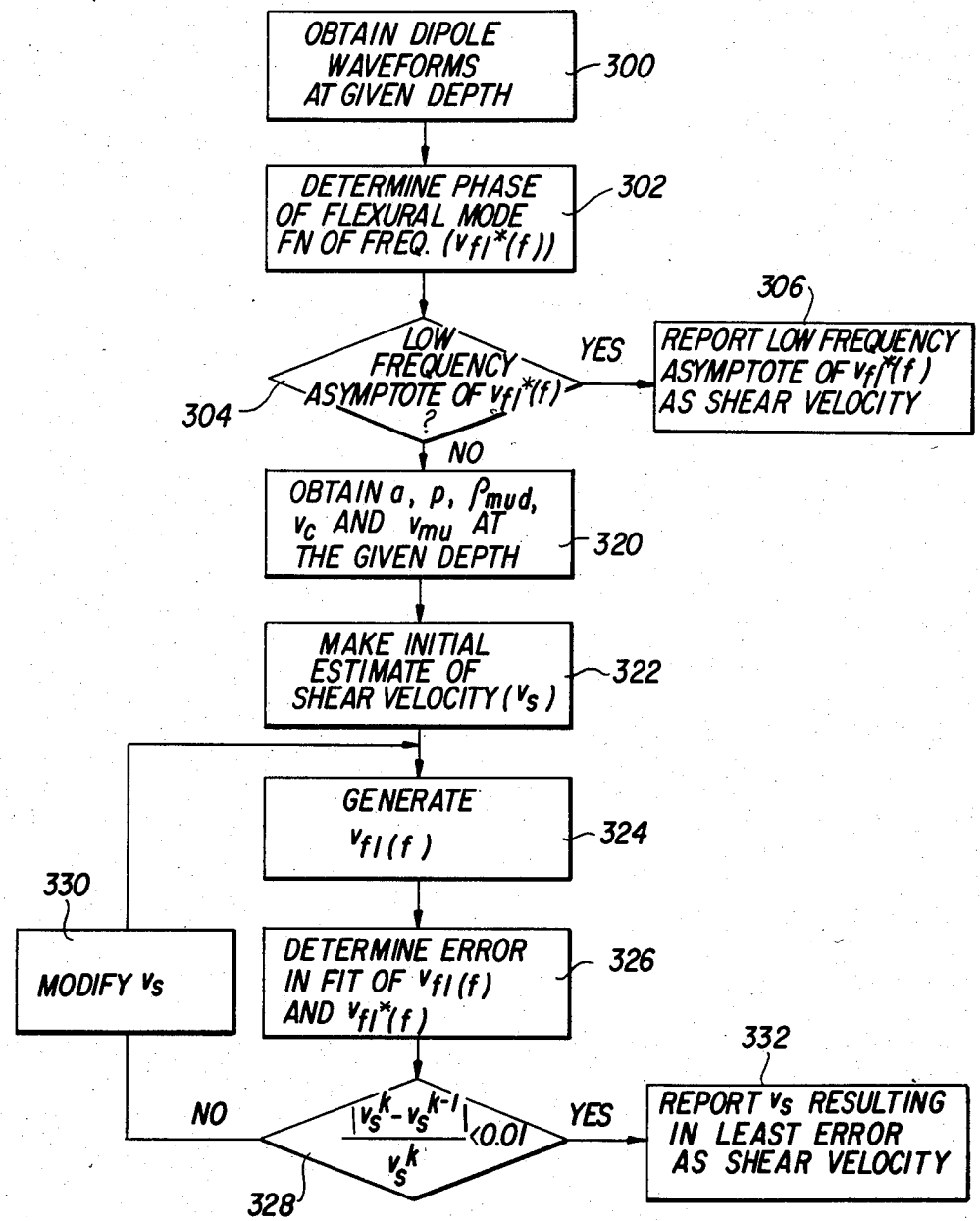
FIG. 18 is a flow diagram of another method in accordance with the present invention.

A method for determining shear velocity from the flexural mode is illustrated in FIG. 18. Waveforms are obtained for each borehole depth at step 300 by energizing dipole transmitter 56 with a suitable pulse supplied by pulse former 62 and amplified by amplifier 64. The timing of the pulse is directed by microprocessor 80, through transmitter interface 60. Propagating acoustic energy is detected by an array of detectors such as, for example, dipole detectors 58 and 59, and amplified by gated amplifiers 72 and 73, under control of microprocessor 80 through receiver interface 70. The detected acoustic signals are respectively digitized by converters 74 and 75, and the waveform data furnished to microprocessor 80. Waveform data is stored by microprocessor 80, and then transmitted to the surface processor 94.

Subsequent processing may be performed either by microprocessor 80 or processor 94. First, a digital representation of the curve $V_{fl}*(f)$, the phase velocity of the flexural mode as a function of frequency, is obtained at step 302 by applying such techniques as the maximum likelihood method or Prony's method to the received waveforms. The maximum likelihood method and its application are described in K. Hsu, "Application of the Maximum Likelihood Method to Sonic Velocity Logging," Extended Abstracts, 54th Annual International SEG Meeting, Borehole Geophysics Sessions, December 1984, pp. 1-3, which is incorporated herein by reference. Prony's method and its application are described in T. W. Parks, J. H. McClellan, and C. F. Morris, "Algorithms for Full-Waveform Sonic Logging," Transactions, IEEE ASSP Workshop on Spectral Estimation, November 1982, which is incorporated herein by reference.

At step 304, a test is made to determine whether the velocity information includes low frequency data. If so, then the shear velocity is the low frequency asymptote of the flexural mode phase velocity. This low frequency asymptote is reported at step 306. A visual representation appears in FIG. 19, wherein $v_{fl}*(f)$ is represented by curve 308 and the low frequency asymptote by line 309. If the frequency information does not include a low frequency asymptote, as shown by curve 310 in FIG. 20, further processing is required.

The goal of this further processing is to find a value for $v_s$ such that $v_{fl}*(f)$, a theoretical curve of the flexural mode velocity as a function of frequency, fits $v_{fl}*(f)$ Additional information is required to generate $v_{fl}(f)$, however. Using conventional borehole logging tools and conventional techniques, the following parameters are measured at step 320: "a," the borehole radius; "$\rho$," the density of the formation "$\rho_{mud}$," the density of the borehole mud; "$v_c$," the velocity of the compressional wave; and "$v_{mud}$," the fluid velocity.

An initial estimate for $v_s$, the shear velocity, also is required and is performed at step 322. In most logging situations of practical interest, $v_{fl}*(f)$ is slower than the formation shear velocity, and a suitable initial estimate is $v_s^{(1)} = 1.1(v_{fl}*(f_p))$. Essentially, the low frequency flexural mode velocity merely is increased by a suitable percentage, such as 10%. The frequency $f_p$ is defined as the frequency at which energy is maximum, and is determined on the basis of standard spectral analysis techniques. Specifically, as illustrated by curve 313 of FIG. 20, the energy content of the signal is determined as a function of frequency from a Fourier transform of the signal. The frequency $f_p$ is identified at the energy peak $E_p$. A second boundary condition is that the shear velocity must be less than 0.707 of the compressional velocity, $v_c$, since Poisson's ratio is greater than 0 for materials encountered in logging. Hence, the estimate of $v_s$ is bounded as:

$$v_s^{(1)} = \min(0.707 v_c, 1.1 v_{fl}*(f_p)) \tag{10}$$

Having values for all required parameters, Vfl(f) is determined for the given $v_s$ at step 324, as follows. The following equation is solved for $k_z (= \omega / v_{fl})$.

$$a_{11}[a_{22}(a_{33}a_{44} - a_{43}a_{34}) - a_{23}(a_{32}a_{44} - a_{42}a_{34}) + \tag{11}$$
$$a_{24}(a_{32}a_{43} - a_{42}a_{33})] - a_{21}[a_{12}(a_{33}a_{44} - a_{43}a_{34}) -$$
$$a_{13}(a_{32}a_{44} - a_{42}a_{34}) + a_{14}(a_{32}a_{43} - a_{42}a_{33})] = 0$$

Expressions for $a_{11}, \ldots, a_{44}$ are as follows:

$$a_{11} = -J_n'(\gamma_f) \tag{12}$$

$$a_{21} = \frac{\rho_f}{\rho} x_s^2 J_n(\gamma_f) \tag{13}$$

$$a_{12} = H_n^{(1)'}(\gamma_c) \tag{14}$$

$$a_{22} = \{2n^2 + 2x_s^2 - x_s^2\} H_n^{(1)}(\gamma_c) - 2H_n^{(1)'}(\gamma_c) \tag{15}$$

$$a_{32} = 2x_z^2 H_n^{(1)'}(\gamma_c) \tag{16}$$

$$a_{42} = -2n\{H_n^{(1)'}(\gamma_c) - H_n^{(1)}(\gamma_c)\} \tag{17}$$

$$a_{13} = H_n^{(1)'}(\gamma_s) \tag{18}$$

$$a_{14} = n H_n^{(1)}(\gamma_s) \tag{19}$$

$$a_{23} = 2[(n^2 - \gamma_s^2) H_n^{(1)}(\gamma_s) - H_n^{(1)'}(\gamma_s)] \tag{20}$$

$$a_{24} = 2n[H_n^{(1)'}(\gamma_s) - H_n^{(1)}(\gamma_s)] \tag{21}$$

$$a_{33} = (x_z^2 - \gamma_s^2) H_n^{(1)'}(\gamma_s) \tag{22}$$

$$a_{34} = n x_z^2 H_n^{(1)}(\gamma_s) \tag{23}$$

$$a_{43} = -2n[H_n^{(1)'}(\gamma_s) - H_n^{(1)}(\gamma_s)] \tag{24}$$

$$a_{44} = \{\gamma_2^2 - 2n^2\} H_n^{(1)}(\gamma_s) + 2H_n^{(1)'}(\gamma_s)] \tag{25}$$

where $$\gamma_f = k_r^{(mud)} a = \sqrt{k_{mud}^2 - k_z^2} \, a, \quad Im(\gamma_f) \geq 0 \tag{26}$$

$$\gamma_c = k_r^{(c)} a = \sqrt{k_c^2 - k_z^2} \, a, \quad Im(\gamma_c) \geq 0 \tag{27}$$

$$\gamma_s = k_r^{(s)} a = \sqrt{k_s^2 - k_z^2} \, a, \quad Im(\gamma_s) \geq 0 \tag{28}$$

$$x_z = k_z a \tag{29}$$

$$x_s = k_s a \tag{30}$$

($k_{mud} = \omega/v_{mud}$; $k_c = \omega/v_c$; $k_s = \omega/v_s$; and $\omega = 2\pi f$), and where "n" is taken equal to unity, $\rho$ denotes the density of the formation, $\rho_f$ denotes the density of the fluid (mud) in the hole, $H_n^{(1)}$ denotes a Hankel function of order n and type 1, $J_n$ denotes a Bessel function of order n, and the primes are shorthand notation for $a\partial/\partial a$, for example, $$J_n'(\gamma_f) = a\partial J_n(\gamma_f)/\partial \gamma_f = n J_n(\gamma_f) - \gamma_f J_{n+1}(\gamma_f) \tag{31}$$

The curve $v_{fl}(f)$ is generated beginning at frequency $f_{max}$. Specifically, at $f = f_{max}$, equation (11) is evaluated repeatedly, each time using a different value of $k_z$. Perhaps 100 values of $k_z$ are tried in a range associated with physically reasonable sound velocities. The value of $k_z$ which comes closest to satisfying equation (11) is selected as an initial guess of the $k_z$ associated with the flexural mode at $f = f_{max}$. Following this, the Newton-Raphson method is used to locate the value of $k_z$ more accurately. The method and its application are discussed in R. W. Hamming, *Numerical Methods for Scientists and Engineers*, Second Ed., 1962, pp. 68-70, which is incorporated herein by reference. Frequency f then is lowered by $\Delta f$, selected on the basis of temporal aliasing. Specifically, if the time duration of the flexural mode arrival is denoted by T (seconds), then $\Delta f$ (Hertz) should be chosen less than or equal to 1/T. The initial guess for $k_z$ at $f=f-\Delta f$ is given by $$k_z(f - \Delta f) = k_z(f) \frac{(f - \Delta f)}{f} \quad (32)$$

Using this initial guess, the Newton-Raphson method is again applied to equation (11) to find $k_z(f-\Delta f)$. The frequency is reduced incrementally and the sequence repeated until the curve $v_{fl}(f)$ is generated.

Having obtained $v_{fl}(f)$, a test is made at step 326 to determine if $v_{fl}(f)$ fits $v_{fl}*(f)$ in the frequency band between $f_1$ and $f_2$. This frequency band would have been determined earlier, in step 322 for example, while determining $f_p$ using standard spectral analysis techniques. The frequencies $f_1$ and $f_2$ are defined as frequencies for which the energy is some selected amount lower than the energy peak. The amount preferably is a factor of 10, i.e., if the energy peak is $E_p$, and occurs at $f_p$, then $f_1$ and $f_2$ are the frequencies at which the energy is equal to $E_p/10$. These relationships are illustrated by curve 313 of FIG. 20.

The curve fitting problem can be expressed in two ways.

Find $v_s$, such that:

$$\sum_{f_1 < f < f_2} |v_{fl}(f) - v_{fl}*(f)|^2 \quad (33)$$

is minimum, subject to $v_{fl}*(f) < v_s < 0.707 v_c$;

Find $v_s$, such that:

$$\max_{f_1 < f < f_2} |v_{fl}(f) - v_{fl}*(f)| \quad (34)$$

is minimum, subject to $v_{fl}*(f) < v_s < 0.707 v_c$.

The approach to solving these problems need not be described, since it is well known in general. See, e.g., Hamming, supra at 427-29 (least squares) and at 478 (mini-max).

At step 326, a determination is made of the error of the fit between $v_{fl}(f)$ and $v_{fl}*(f)$. In FIG. 20, for example, the fit between curves 310 and 312 is poor, while the fit between curves 310 and 311 is good. Denoting the initial estimate of $v_s$ as $v_s^0$ and the associated error as computed from expression (33) or expression (34) as $E^0$, a second $v_s$, denoted as $v_s^1$, is computed using $v_s^1 = 1.05 v_s^0$. The error associated with the second $v_s$ is $E^1$. Subsequent estimates of $v_s$ are computed using the relationship $$v_s^k = v_s^{k-1} - \frac{E^{k-1}}{E^{k-1} - E^{k-2}} \cdot (v_s^{k-1} - v_s^{k-2}), \text{ for } k = 2,3, \quad (35)$$

and the process is continued until the $v_s^k$ are no longer changing, indicating that the iterations have converged: One suitable test, for example, is $|v_s^k - v_s^{k-1}|/v_s^k < 0.01$.

A preferred method involves computing the error using expression (33) or expression (34) for a variety of values ranging from 0.5 km/sec to 4 km/sec (steps 330, 326 and 328 iteratively), and reporting the value of $v_s$ that results in the least error (step 332).

While the present invention has been described with reference to several particular embodiments, it will be appreciated that the embodiments are illustrative only, in that the invention is not intended to be limited to the disclosed embodiments. Variations and combinations within the spirit and scope of the invention may occur to those skilled in the art. Accordingly, these variations are contemplated and are within the scope of the present invention, as defined by the following claims.

What is claimed is:

1. A method of determining the shear velocity of a formation traversed by a fluid-filled borehole, comprising the steps of:
   obtaining a plurality of waveforms from a dipole acoustic investigation of the formation relative to a common location in the borehole;
   determining from said waveforms a flexural mode phase velocity as a function of frequency;
   selecting an estimated shear velocity;
   theoretically determining a flexural mode phase velocity as a function of frequency, from said estimated shear velocity;
   fitting said theoretically determined flexural mode phase velocity to said waveform-determined flexural mode phase velocity;
   repeating said selecting, theoretically determining, and fitting steps for additional estimated shear velocities until a least error fit is identified; and
   reporting the last-estimated shear velocity as the shear velocity of the formation.

2. An apparatus for determining the shear velocity of a formation traversed by a fluid-filled borehole, comprising:
   means for obtaining a plurality of waveforms from a dipole acoustic investigation of the formation relative to a common location in the borehole;
   means for determining from said waveforms a flexural mode phase velocity as a function of frequency;
   means for selecting an estimated shear velocity;
   means for theoretically determining a flexural mode phase velocity as a function of frequency, from said estimated shear velocity;
   means for fitting said theoretically determined flexural mode phase velocity to said waveform-determined flexural mode phase velocity;
   means for iteratively actuating said selecting means, theoretically determining means, and fitting means for additional estimated shear velocities until a least error fit is identified; and
   means for reporting the last-estimated shear velocity as the shear velocity of the formation.

3. The method of claim 1, wherein said estimated shear velocity is selected as a function of the flexural mode velocity.

4. The method of claim 3, wherein said estimated shear velocity to be the lesser of 1.1 times the flexural mode velocity at the frequency for which the energy of said flexural mode is maximum and 0.707 times the compressional wave velocity.

5. The method of claim 1, wherein said theoretically determined flexural mode phase velocity is determined as a function of frequency by selecting for each frequency an estimated flexural mode phase velocity and iteratively adjusting said estimated phase velocity for conformity with a predetermined function of said estimated shear velocity.

6. The method of claim 5, wherein said predetermined function of said estimated shear velocity is as defined in equations (11) through (31) above.

7. The apparatus of claim 2, wherein said selecting means is adapted to select said estimated shear velocity as a function of the flexural mode velocity.

8. The apparatus of claim 7, wherein said selecting means is adapted to select said estimated shear velocity as the lesser of 1.1 times the flexural mode velocity at the frequency for which the energy of said flexural mode is maximum and 0.707 times the compressional wave velocity.

9. The apparatus of claim 2, wherein said means for theoretically determining a flexural mode phase velocity as a function of frequency is adapted to select for each frequency an estimated flexural mode phase velocity and iteratively adjust said estimated phase velocity for conformity with a predetermined function of said estimated shear velocity.

10. The apparatus of claim 9, wherein said predetermined function of said estimated shear velocity is as defined in equations (11) through (31) above.

* * * * *